United States Patent [19]

Smith et al.

[11] Patent Number: 5,840,376
[45] Date of Patent: Nov. 24, 1998

[54] HIGH MAGNETIC FIELD PROCESSING OF LIQUID CRYSTALLINE POLYMERS

[75] Inventors: Mark E. Smith; Brian C. Benicewicz; Elliot P. Douglas, all of Los Alamos, N. Mex.

[73] Assignee: The Regents of the University of California, Los Alamos, N. Mex.

[21] Appl. No.: 608,343

[22] Filed: Feb. 28, 1996

[51] Int. Cl.⁶ .................................................. C09K 19/00
[52] U.S. Cl. ........................ 428/1; 252/299.01; 428/212; 428/220
[58] Field of Search ............................... 428/1, 212, 220; 252/299.01

[56] References Cited

U.S. PATENT DOCUMENTS

| | | | |
|---|---|---|---|
| 4,786,348 | 11/1988 | Luise | 428/1 |
| 4,808,149 | 2/1989 | Standley | 474/260 |
| 5,266,660 | 11/1993 | Hefner, Jr. et al. | 525/481 |
| 5,266,661 | 11/1993 | Earls et al. | 525/481 |
| 5,270,404 | 12/1993 | Earls et al. | 525/481 |
| 5,270,405 | 12/1993 | Earls et al. | 525/481 |
| 5,270,406 | 12/1993 | Earls et al. | 525/481 |
| 5,292,831 | 3/1994 | Earls et al. | 525/523 |
| 5,460,860 | 10/1995 | Hefner | 428/1 |

OTHER PUBLICATIONS

C. K. Ober et al., "Liquid Crystalline Thermosets As Materials For Microelectronics", Mat. Res. Soc. Symp. Proc., V. 227, 1991, pp. 281–293.

G. G. Barclay et al., "Mechanical and Magnetic Orientation of Liquid Crystalline Epoxy Networks" Proc. ACS Div. Polymene Materials: Science & Engineering, V. 200, pp. 387–391 (1990).

M. F. Gray et al., "Influence of Low Magnetic Fields on Semicrystalline Polymers". Journal of Applied Polymer Science, vol. 28, pp. 3603–3606 (1983).

Roger H. Gerzeski, "Mechanical Property Enhancement of an Epon 828—Teta Neat Epoxy Resin System Via Magnetic Field Coprocessing", International SAMPE Symposium, 1991, pp. 1368–1382.

S. Jahromi et al., "Liquid Crystalline Wpoxide Thermosets. Dynamic Mechanical and Thermal Properties" Macromolecules, 1995, vol. 28, No. 7, pp. 2201–2211.

Charles E. Hoyle et al., "Anisotropic Network Formation by Photopolymerization of Liquid Crystal Monomers in a Low Strength Magnetic Field", Macromolecules, 1994, vol. 27, No. 22, pp. 6581–6588.

G. G. Barclay et al., "Rigid–Rod Thermosets Based on 1,3 5–Triazine–Linked Aromatic Ester Segments" Macromolecules, 1992, vol. 25, No. 11, pp. 2947–2954.

G. G. Barclay et al., "The Mechanical and Magnetic Alignment of Liquid Crystalline Epoxy Thermosets" Journal of Polymer Science, 1992, vol. 30, pp. 1845–1853.

Linda C. Sawyer et al., "The Structure of Thermotropic Copolyesters", Journal of Material Science, 1986, pp. 1897–1913.

*Primary Examiner*—Nasser Ahmad
*Attorney, Agent, or Firm*—Bruce H. Cottrell

[57] ABSTRACT

A process of forming bulk articles of oriented liquid crystalline thermoset material, the material characterized as having an enhanced tensile modulus parallel to orientation of an applied magnetic field of at least 25 percent greater than said material processed in the absence of a magnetic field, by curing a liquid crystalline thermoset precursor within a high strength magnetic field of greater than about 2 Tesla, is provided, together with a resultant bulk article of a liquid crystalline thermoset material, said material processed in a high strength magnetic field whereby said material is characterized as having a tensile modulus parallel to orientation of said field of at least 25 percent greater than said material processed in the absence of a magnetic field.

2 Claims, No Drawings

HIGH MAGNETIC FIELD PROCESSING OF LIQUID CRYSTALLINE POLYMERS

This invention is the result of a contract with the Department of Energy (Contract No. W-7405-ENG-36).

FIELD OF THE INVENTION

The present invention relates to high magnetic field processing of liquid crystalline polymers and the resultant products from such processing, i.e., liquid crystalline polymers having improved mechanical properties.

BACKGROUND OF THE INVENTION

Liquid crystalline thermosets (LCT's) have become recognized over the past few years as an important new class of materials. Numerous reports have described their synthesis and phase behavior. In particular, important effects due to the orientation of the rodlike molecules in a liquid crystalline phase have been described. It has been found that curing rates are enhanced compared to reaction in an isotropic phase, and that the glass transition of the fully cured material can be significantly higher than the final cure temperature.

For structural applications, orientation of LCT's promotes the maximization of mechanical properties. A few studies have described use of magnetic fields to orient LCT's. However, the maximum reported field strength was 13.5 T and the polymer placed in the field was typically contained in microcapillary-type tubes such that the polymer was essentially a microfiber in physical dimensions, and no measurements were made of the resultant tensile properties.

It is an object of the present invention to provide a process of processing LCT's in high magnetic fields and further to provide a process for variable control of factors such as, e.g., field strength, B-staging, time in field, temperature, and selection of catalyst to obtain a product with, e.g., a desired tensile modulus. Such a desired tensile modulus can be selected for a particular application but can exceed $5 \times 10^5$ pounds per square inch, preferably $8 \times 10^5$ pounds per square inch, and more preferably $1 \times 10^6$ pounds per square inch.

It is a further object of the invention to provide resultant products of LCT's processed in high magnetic fields, such products characterized by an enhancement of, e.g., tensile modulus, over non-magnetically processed LCT's, such enhancement on the order of at least 25 percent, preferably 50 percent and more preferably 100 percent. The resultant products can typically be characterized by tensile modulus properties exceeding $5 \times 10^5$ pounds per square inch, preferably $8 \times 10^5$ pounds per square inch, and more preferably $1 \times 10^6$ pounds per square inch.

SUMMARY OF THE INVENTION

To achieve the foregoing and other objects, and in accordance with the purposes of the present invention, as embodied and broadly described herein, the present invention provides a bulk article of a liquid crystalline thermoset material, said material processed in a high strength magnetic field whereby said material is characterized as having an enhanced tensile modulus parallel to orientation of said field of greater than about 25 percent, preferably 50 percent, and more preferably 100 percent over non-magnetically processed material.

The present invention further provides a process of forming bulk articles of oriented liquid crystalline thermoset materials, said materials characterized as having an enhanced tensile modulus parallel to orientation of said field of greater than about 25 percent, preferably 50 percent, and more preferably 100 percent over non-magnetically processed material comprising curing a liquid crystalline thermoset precursor within a high strength magnetic field of greater than about 2 Tesla.

DETAILED DESCRIPTION

The present invention is concerned with orientation of LCT's in field strengths from about 2 Tesla (T) up to 10 to 20 T or more. The resultant oriented LCT product can show enhancement of properties such as improved tensile modulus of greater than about 25 percent compared to those for unoriented LCT's, preferably greater than about 50 percent and more preferably greater than about 100 percent. The present invention is further concerned with shaped articles or bulk articles of the magnetically processed LCT's. By "bulk article" is meant an article having dimensions of generally at least about 0.125 inches in each direction, i.e., height, width and depth (x, y, and z), and more preferably having at least one dimension in excess of about one inch. Such a bulk article can be shaped in a suitable mold to yield a shaped article or machined. Orientation of the LCT material processed in accordance with the present invention is found throughout the entirety of the bulk article and not limited to orientation on only the surface of the material.

Additonally, the present invention involves variable control of LCT processing such that a desired bulk article with targeted tensile modulus properties can be achieved by control of variables such as, e.g., the strength of the magnetic field, B-staging of the polymer and the length thereof, the amount of time of the magnetic processing, the temperature during processing, and selection of the catalyst for the LCT.

The LCT can generally be of any chemical structure. Numerous LCT's are known to those of skill in the art. For example, an exemplary LCT is the diglycidyl ether of dihydroxy-alpha-methylstilbene (DGE-DHAMS) cured with the diamine, sulfanilamide (SAA). Structures for these materials are shown by the structures:

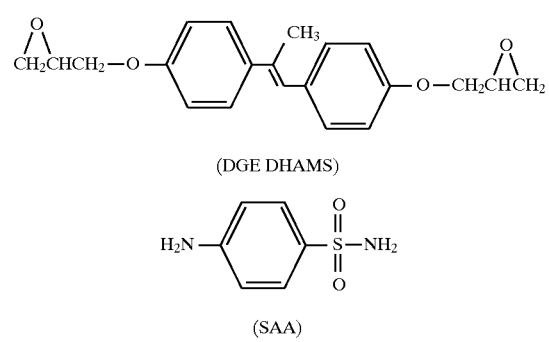

(DGE DHAMS)

(SAA)

Another suitable LCT is the diglycidyl ether of dihydroxy biphenyl (DGE-biphenyl). Other suitable LCT's can include materials such as those described in U.S. Pat. Nos. 5,114,612; 5,198,551; 5,475,133; 5,266,660; 5,266,661; 5,270,404; 5,270,405; 5,270,406; and, 5,292,831. Mixtures of different LCT's may also be employed as may mixtures of LCT's and liquid crystalline polymers (LCP's) such as Vectra® polyester, Kevlar® aromatic polyamide, and Xydar® polyester. Also, mixtures or combinations of polymer materials including at least one LCT may be employed.

The magnetic fields for processing the LCT's are high strength magnetic fields, i.e., fields generally greater than about 2 Tesla, preferably greater than about 6 Tesla, and more preferably from about 10 to 20 Tesla or greater.

The present invention is more particularly described in the following examples which are intended as illustrative only, since numerous modifications and variations will be apparent to those skilled in the art.

EXAMPLE 1

Thermosets were cured at field strengths of up to 18 Tesla to evaluate the effects of very high magnetic fields on the properties of the system.

Magnetic Field Processing: The thermoset formulation was prepared by dissolving 1 equivalent of SAA and 2 milliequivalents of an organophosphonium catalyst into 1 equivalent of DGE-DHAMS at elevated temperatures. This mixture was then poured into a mold for the magnetic field experiments. This mold consisted of a Teflon cup onto which was placed two aluminum heater blocks, with the thermoset formulation filling the space between the blocks. Temperature control was maintained with a PID controller. Magnetic field experiments were conducted at the National High Magnetic Field Laboratory using a 20 T variable field electromagnet. Curing was done in the field for 1 hr at 150° C. The sample was then removed from the mold by cutting the Teflon cup and separating the aluminum plates. The final cure was done in a conventional oven, and consisted of an additional 3 hrs at 150° C., 1 hr at 175° C., and 4 hrs at 200° C. Plaques approximately 2 inches by 1.5 inches by 0.125 inches were obtained.

Thermal Expansion: Thermal expansion measurements were performed parallel and perpendicular to the field direction using an Omnitherm TMA 1000 with a heating rate of 5° C./minute and a mass of 10 grams. Values of the coefficient of thermal expansion (CTE) reported are calculated by linear extrapolation of the displacement-temperature curve over the temperature range 30° to 60° C.

Tensile Properties: Tensile properties were measured on ASTM Type V specimens using an Instron 4483 testing machine and an MTS 632.26E extensometer. The results for this example are the average of at least three different runs of sample for each field strength.

X-ray Diffraction: X-ray diffraction was performed using a rotating anode generator and a two dimensional position sensitive detector. Calculation of the orientation parameter was done using the equation $$f = \frac{1}{2} (3 <\cos^2\phi> - 1)$$

where the average value of $\cos^2 \phi$ is given by $$<\cos^2\phi> = \frac{\int_0^{\pi/2} I(\phi)\sin\phi\cos^2\phi d\phi}{\int_0^{\pi/2} I(\phi)\sin\phi d\phi}$$

The DGE-DHAMS/SAA system, which is initially isotropic, forms a smectic phase upon curing at 150° C. The formation of the smectic phase is due to an increase in aspect ratio of the rodlike molecules as the reaction proceeds. Under these conditions, the smectic phase forms after approximately 20 minutes of cure, and the gel point is reached in approximately 45 minutes. Curing in the magnetic field was done for 1 hour in order to ensure that any orientation induced by the field was locked into the network structure.

Tensile properties of the final cured LCT at 0, 15, 18 T are shown in Table 1. The tensile properties of the macroscopically unoriented material are similar to those obtained with epoxies based on bisphenol-A cured under the same conditions. The unique advantages of the liquid crystalline epoxy are realized when the material is oriented in magnetic fields. Particularly noteworthy is the increase in tensile modulus. Orientation in magnetic fields leads to an increase of almost three times the modulus compared to the unoriented material. The strain at break is also significantly affected by the chain orientation. While not wishing to be bound by the present explanation, it is believed that the reduction in strain at break and the increase in the modulus are due to the decreased elasticity of chemical bonds in the direction of orientation as a result of the magnetic field, as compared to segment reorientation which dominates the stress-strain behavior in an unoriented sample. The oriented product is strengthened by locking into a more perfect or ordered grid.

Measurements of the coefficient of linear thermal expansion, shown in Table 2; also indicate a high degree of anisotropy in samples prepared in magnetic fields. Again, the CTE values of the unoriented sample are similar to those of conventional epoxy thermosets. Alignment in magnetic fields causes a significant decrease in the thermal expansion parallel to the field direction and a significant increase in the thermal expansion perpendicular to the field direction. This is also consistent with the magnetic field inducing substantial bulk orientation such that molecules are aligned parallel to the direction of the field.

In order to quantify the orientation, x-ray diffraction measurements were performed. The orientation parameter was determined by integrating the scattered intensity around the azimuthal angle $\phi$ at a given value of the scattering angle $2\theta$ according to the equations given above. The orientation parameters calculated are 0.93 and 0.90 for 15 and 18 T, respectively, where a value of 1.0 indicates complete orientation. These two values are the same within experimental error. X-ray results confirm that the molecular axes and the smectic layer normals are aligned parallel to the field direction.

The present invention describes preliminary results on magnetic field processing of liquid crystalline thermosets. Information on the mechanical properties of liquid crystalline thermosets, both unaligned and aligned in high magnetic fields, has been evaluated. These are the highest fields used to date for alignment of liquid crystalline molecules, and the degree of order obtained is higher than previously reported. Mechanical properties show significant increases in tensile modulus, giving values much greater than can be obtained with conventional thermoset processing.

TABLE 1

| | Tensile Properties | | |
| --- | --- | --- | --- |
| | 0 Tesla | 15 Tesla | 18 Tesla |
| modulus (ksi) | 443 | 1081 | 1174 |
| strain at break (%) | 8.9 | 0.8 | 1.0 |
| stress at break (psi) | 13,010 | 8117 | 9985 |

TABLE 2

Coefficients of Thermal Expansion

|  | 0 Tesla | 15 Tesla | 18 Tesla |
|---|---|---|---|
| CTE parallel to field ($\mu$m/m/°C.) | 54 | 4.7 | 4.3 |
| CTE perp. to field ($\mu$m/m/°C.) | — | 99.6 | 111.2 |

EXAMPLE 2

The following materials were used: digylcidyl ether of dihydroxy-alpha-methyl stilbene (DHAMS), sulfanilamide (SAA), various organophosphonium catalysts, and a non-liquid crystalline material, i.e., diglycidyl ether of bisphenol-A (DER 332).

The various materials were formulated and placed into the mold described in Example 1. The molds were placed into the high strength magnetic fields and respective samples cured for various periods of time of five minutes, thirty minutes and fifty-five minutes. Some samples were subjected to B-staging for forty-five minutes or ninety minutes prior to reaction in the field. The curing temperature in the field was generally 150° C.

Physical properties of the resultant shaped articles from the cured molds were measured including measurement of tensile modulus parallel to the field in kilopounds per square inch, tensile modulus perpendicular to the field in kilopounds per square inch, thermal expansion coefficient in microns per meter per °C. for both parallel and perpendicular to the direction of the field, and an x-ray order parameter as determined by wide angle x-ray scattering with −0.5 indicating the molecules were completely aligned perpendicular to the field, 0.0 indicating that the molecules were arranged randomly, and 1.0 indicating that the molecules were aligned completely parallel to the field.

TABLE 3

| Field (Tesla) | Time (minutes) | B-Stage (minutes) | Tensile (k-lbs/sq.in.) | Thermal Expansion coefficient par./perp. | X-ray |
|---|---|---|---|---|---|
| 5 | 5 | 0 | 472 | 61/63 | 0.081 |
| 5 | 5 | 90 | 570 | 34/71 | 0.392 |
| 5 | 55 | 0 | 401 | 67/64 | −0.072 |
| 5 | 55 | 90 | 764 | 17/90 | 0.755 |
| 10 | 30 | 0 | 466 | 62/65 | |
| 10 | 30 | 45 | 628 | 63/64 | |
| 10 | 55 | 0 | 563 | 37/76 | |
| 10 | 55 | 45 | 900 | 5/96 | |
| 15 | 5 | 0 | 407 | 63/64 | −0.108 |
| 15 | 5 | 90 | 725 | 21/78 | |
| 15 | 30 | 0 | 438 | 63/66 | −0.253 |
| 15 | 30 | 45 | 513 | 66/64 | 0.545 |
| 15 | 55 | 0 | 1081 | 7/94 | 0.799 |
| 15 | 55 | 45 | 1042 | 17/84 | |
| 15 | 55 | 90 | 1190 | 4/96 | 0.904 |

The results of Table 3 show that various combinations of field strength, time in field, and B-staging can yield significant enhancement in tensile modulus properties of the resultant article. For example, at 5 Tesla, the length of time in the magnetic field has no appreciable effect, but with the addition of B-staging of the polymer an enhancement of tensile modulus is observed at only 5 minutes within the magnetic field with dramatically greater enhancement for 55 minutes within the magnetic field. Also, it can be seen that in the absence of B-staging, 30 minutes within a 15 Tesla field has no appreciable effect, but that 55 minutes within the same field provides a dramatic enhancement of tensile modulus. Comparison of other factors demonstates that a combination of parameters or variables can be controlled to provide a desired enhancement of tensile modulus. Thus, any particular tensile modulus desired for a particular application may be arrived in a number of ways by control and selection of the variable parameters.

TABLE 4

| Field Strength (Tesla) | Tensile Modulus [kpsi]; par./perd. samples A | Tensile Modulus [kpsi]; par./perd. samples B |
|---|---|---|
| 3 | 744.9; 18.4/71.4 | 1084; 5.9/77.4 |
| 6 | 950.0; 6.5/74.9 | 1079; 5.5/75.1 |
| 9 | 1017; 7.6/80.0 | 1288; 2.8/78.2 |
| 12 | 819.7; 14.5/70.4 | 1058; −1.1/76.3 |
| 15 | 1081; 4.7/80.7 | |
| 18 | 1174; 4.4/89.6 | |

The results of Table 4 show that tensile modulus can be increased up to about three times that of the same material processed in the absence of a magnetic field (tensile modulus was shown in Table 1 to be about 443 kpsi for no magnetic field processing.

TABLE 5

| Sample | Curing Conditions | Tensile Modulus (kpsi) | Transverse Modulus (kpsi) |
|---|---|---|---|
| DHAMS/SAA/ catalyst 1 | 18T/55m/0B/ 150° C. | 1174 | 543.7 |
| DHAMS/SAA/ catalyst 1 | 15T/55m/0B/ 150° C. | 1081 | — |
| High purity DHAMS/ SAA/catalyst 1 | 15T/55m/0B/ 150° C. | 1233 | 475.4 |
| DHAMS/SAA/ catalyst 1 | 10T/55m/90B/ 150° C. | 904.1 | 443.9 |
| DHAMS/SAA/ catalyst 2 | 10T/55m/0B/ 150° C. | 469.1 | 498.4 |
| DHAMS/SAA/ catalyst 2 | 15T/5m/0B/ 150° C. | 693.7 | 484.2 |
| DER 332/SAA/ catalyst 1 | 15T/55m/0B/ 180° C. | 475.6 | — |

The results of Table 5 demonstrate that transverse modulus was not affected in the magnetic processing; yet the tensile modulus is dramatically increased. Further, the results show that catalyst can be a factor in reaching a desired product. Catalyst 2 is a faster catalyst than catalyst 1 thereby promoting faster reaction of the LCT. Such a faster catalyst may not allow sufficient time for orientation of the LCT material in the magnetic field. Also, the results show that purity of the liquid crystalline precursor material can affect the resultant properties as well. Finally, the results show that a non-liquid crystalline polymer material remains essentially unaffected by processing in the magnetic field, at least with respect to tensile modulus properties.

Although the present invention has been described with reference to specific details, it is not intended that such details should be regarded as limitations upon the scope of the invention, except as and to the extent that they are included in the accompanying claims.

What is claimed is:

1. A bulk article of a liquid crystalline thermoset material including diglycidyl ether of dihydroxy-alpha-methyl stilbene and sulfanilamide, said material processed in a high strength magnetic field whereby said material is characterized as having a tensile modulus parallel to orientation of said field of at least 25 percent greater than said material processed in the absence of such a high strength magnetic field.

2. A bulk article of a liquid crystalline thermoset material including diglycidyl ether of dihydroxy-alpha-methyl stilbene and sulfanilamide, said material processed in a high strength magnetic field whereby said material is characterized as having a tensile modulus parallel to orientation of said field of at least 50 percent greater than said material processed in the absence of such a high strength magnetic field.

* * * * *